United States Patent
Oshima (10) Patent No.: US 12,437,568 B2
(45) Date of Patent: Oct. 7, 2025

(54) SEARCH DEVICE, SEARCH SYSTEM, SEARCH METHOD, AND STORAGE MEDIUM

(71) Applicant: KABUSHIKI KAISHA TOSHIBA, Tokyo (JP)

(72) Inventor: Hirotomo Oshima, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 18/069,872

(22) Filed: Dec. 21, 2022

(65) Prior Publication Data

US 2023/0215204 A1    Jul. 6, 2023

(30) Foreign Application Priority Data

Jan. 4, 2022   (JP) ................. 2022-000051

(51) Int. Cl.
   *G06V 30/00*   (2022.01)
   *G06T 5/50*    (2006.01)
   (Continued)

(52) U.S. Cl.
   CPC .......... *G06V 30/19173* (2022.01); *G06T 5/50* (2013.01); *G06V 10/82* (2022.01); *G06T 2207/20221* (2013.01)

(58) Field of Classification Search
   CPC ............ G06V 30/19173; G06V 10/82; G06V 30/19147; G06V 10/10; G06V 10/70; G06T 5/50; G06T 2207/20221; G06F 16/90344; G06F 16/434; G06F 16/332; G06F 16/338; G06F 16/438; G06F 16/532; G06F 16/538; G06F 16/55; G06F 16/5846; G06F 18/214
   See application file for complete search history.

(56) References Cited

U.S. PATENT DOCUMENTS 10,007,863 B1 *  6/2018  Pereira .................... G06T 7/337
2012/0323901 A1 * 12/2012  Masuko ............... G06F 16/5846
                                                           707/723
(Continued)

FOREIGN PATENT DOCUMENTS

CN    110069631 A  *  7/2019  ............. G06F 16/35
JP    2017-215859    12/2017
(Continued)

OTHER PUBLICATIONS

Office Action issued in Indian Patent Application No. 202214076781 dated May 26, 2025 in 8 pages.

*Primary Examiner* — Ping Y Hsieh
*Assistant Examiner* — Xiao Liu
(74) *Attorney, Agent, or Firm* — Knobbe, Martens, Olson & Bear, LLP (57) ABSTRACT

A search device generates a character string image of a first character string by using the first character string. The search device inputs the character string image to a classifier. The classifier outputs a classification of a character string according to an input of an image. The search device outputs another character string based on a classification result of the classifier. The other character string is different from the first character string.

10 Claims, 9 Drawing Sheets

(51) Int. Cl.
    *G06V 10/82*     (2022.01)
    *G06V 30/19*     (2022.01)

(56) References Cited

U.S. PATENT DOCUMENTS

| | | |
|---|---|---|
| 2018/0150956 A1 | 5/2018 | Kao et al. |
| 2022/0179550 A1* | 6/2022 | Kaneshige ............... G06F 9/454 |
| 2023/0077608 A1* | 3/2023 | Achiwa ................ G06V 30/413 |
| | | 382/229 |

FOREIGN PATENT DOCUMENTS

| | | |
|---|---|---|
| JP | 2020-047031 A | 3/2020 |
| JP | 2020-095657 | 6/2020 |
| JP | 2020-166415 | 10/2020 |

* cited by examiner

| | CHARACTER STRING | CORRESPONDING CHARACTER STRING | |
|---|---|---|---|
| 101a | BM-YGB2.2NN120D | BM-YGB2.2 | 102a |
| 101b | BM-YGB2.9NN120D | BM-YGB2.9 | 102b |
| 101c | BU4517B1(41) | BU4517B1 | 102c |
| 101d | BU4517C1(41) | BU4517C1 | 102d |
| 101e | BV-EBTI29.5Q1LD | BV-EBTI29.5 | 102e |
| 101f | BV-DASH30Q1LD(29.5) | BV-EBTI30 | 102f |
| 101g | BV-DASH37.5Q600D | BV-EBTI37.5 | 102g |

FIG. 4B          UM4HB          IMG
                                 100

R  BK  IMG1

FIG. 7C

TOSHIBA CORPORATION

FIG. 7D

TOSHIBA CORPORATION

G  BK  IMG2

FIG. 7E

TOSHIBA UM4HB RATION

IMG3

SEARCH TOOL — □ ×

SUPPLIER NAME: TOSHIBA CORPORATION X SALES OFFICE — 201  [REGISTER] — 211
MEMBER NAME: UM4HB — 202  [EXECUTE] — 212

| RANK | CORRESPONDING CHARACTER STRING | CERTAINTY |
|---|---|---|
| 1 | UM4HB-MX1,M(T — 222a | 0.508 |
| 2 | UM4HB-XI1,M(T — 222b | 0.403 |
| 3 | UM4HB-OX0,M(T — 222c | 0.358 |
| 4 | UM4HB-MM1,M(T — 222d | 0.332 |
| 5 | UM4HB-EX1,M(T — 222e | 0.316 |
| 6 | XET2U84-81(XX — 222f | 0.225 |
| 7 | UM2GB-XI1,M(T — 222g | 0.212 |
| 8 | UM3HB-MX1,M(T — 222h | 0.198 |
| 9 | DV-XE50Q1LDHM — 222i | 0.112 |
| 10 | UM2GB-MX0,M(T — 222j | 0.105 |

SEARCH DEVICE, SEARCH SYSTEM, SEARCH METHOD, AND STORAGE MEDIUM

CROSS-REFERENCE TO RELATED APPLICATIONS

This application is based upon and claims the benefit of priority from Japanese Patent Application No. 2022-000051, filed on Jan. 4, 2022; the entire contents of which are incorporated herein by reference.

FIELD

Embodiments described herein relate generally to a search device, a search system, a search method, and a storage medium.

BACKGROUND

There are cases where a character string is used to search for another character string corresponding to the character string. Technology that can reduce the load of such a search task is desirable.

DETAILED DESCRIPTION

According to one embodiment, a search device generates a character string image of a first character string by using the first character string. The search device inputs the character string image to a classifier. The classifier outputs a classification of a character string according to an input of an image. The search device outputs an other character string based on a classification result of the classifier. The other character string is different from the first character string.

Various embodiments are described below with reference to the accompanying drawings. In the specification and drawings, components similar to those described previously or illustrated in an antecedent drawing are marked with like reference numerals, and a detailed description is omitted as appropriate.

Figure 1:
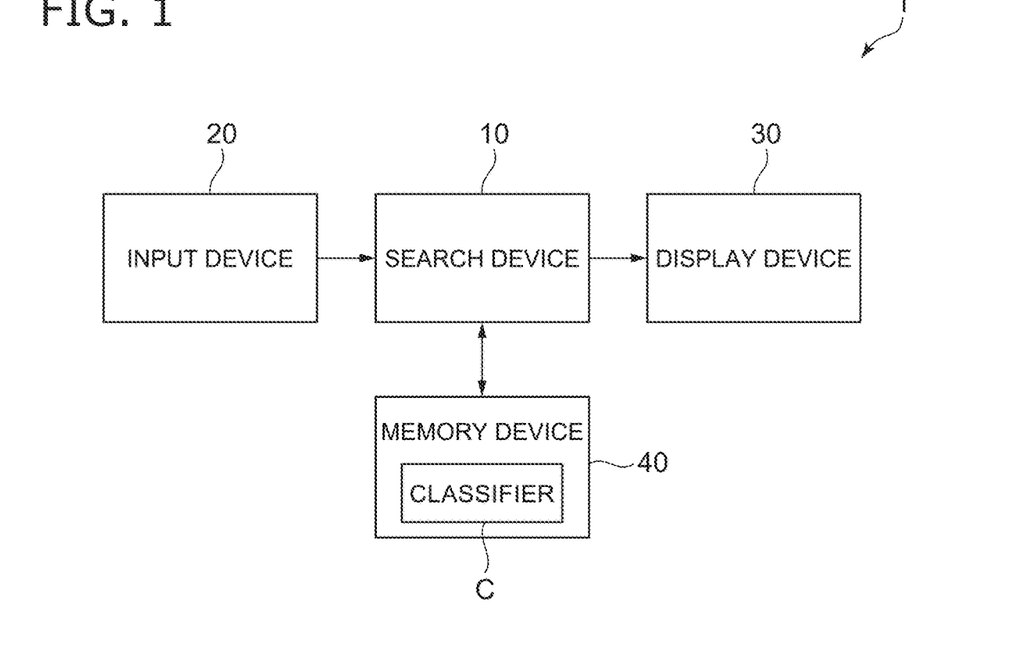
FIG. 1 is a schematic view showing a configuration of a search system according to an embodiment.

FIG. 1 is a schematic view showing a configuration of a search system according to an embodiment.

The search system according to the embodiment uses a character string to search for another character string corresponding to the character string. The search system 1 according to the embodiment includes a search device 10, an input device 20, a display device 30, and a memory device 40.

The search device 10 searches for another character string that corresponds to the input character string. The input device 20 is used by a user to input a character string to the search device 10. The display device 30 displays the search result. The memory device 40 stores data necessary for the search. For example, the memory device 40 stores a classifier C used in the search, a database that includes character strings, etc.

Figure 2:
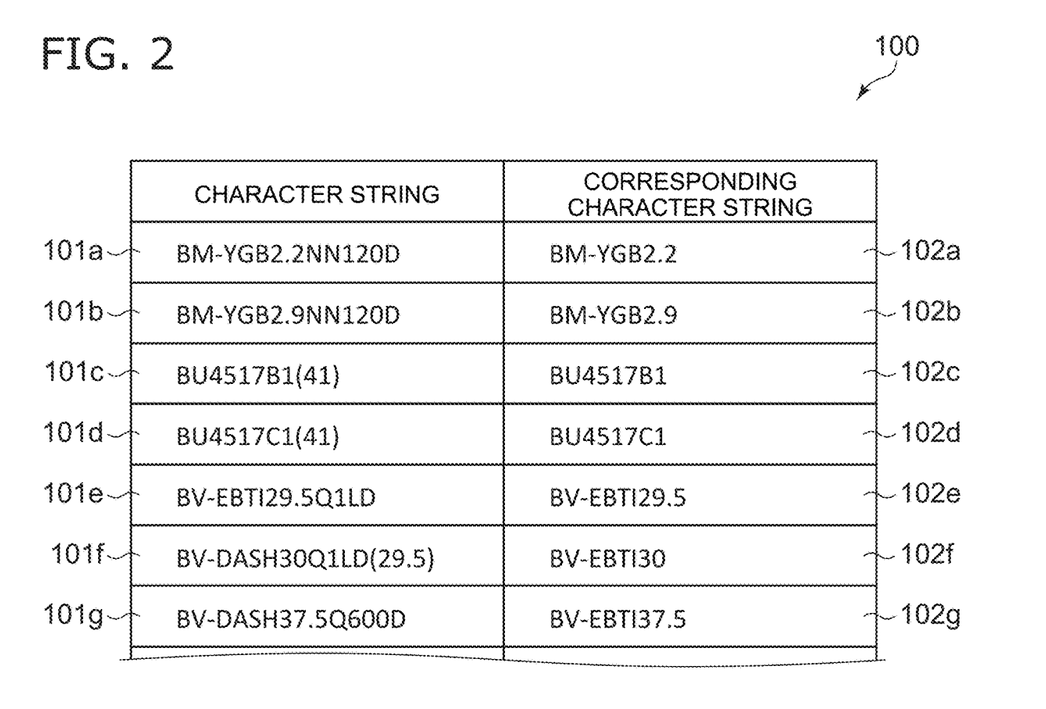
FIG. 2 is an example of a database in which character strings are registered.

FIG. 2 is an example of a database in which character strings are registered.

The database 100 shown in FIG. 2 includes character strings 101a to 101g and corresponding character strings 102a to 102g that correspond respectively to the character strings 101a to 101g. When a character string is input, the search device 10 outputs a corresponding character string that corresponds to the character string. As an example, when receiving the input of a character string of "BM-YGB2.2NN120D", the search device 10 outputs a corresponding character string of "BM-YGB2.2".

Figure 3:
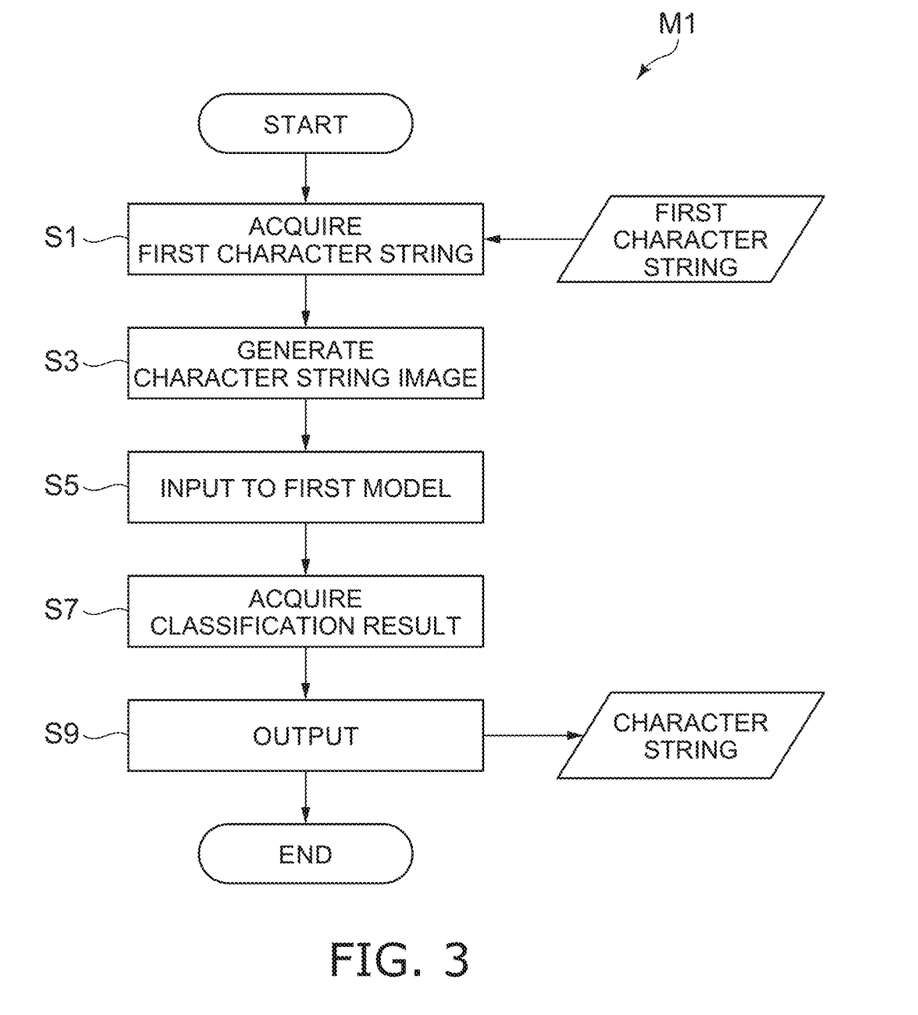
FIG. 3 is a flowchart showing processing according to the search device according to the embodiment.
Figure 4A:
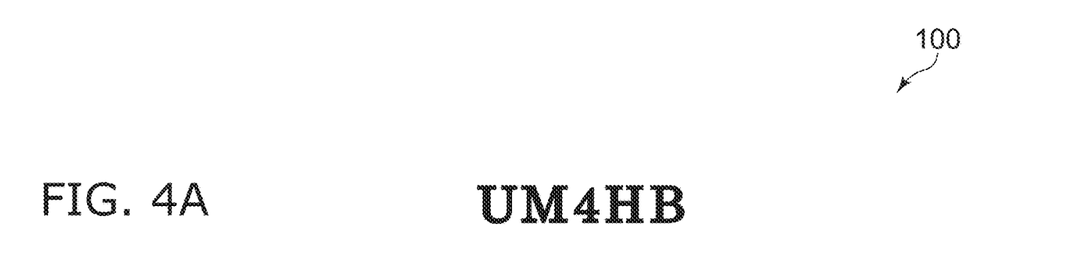
FIGS. 4A to 4C illustrate specific examples of the processing.
Figure 4B:
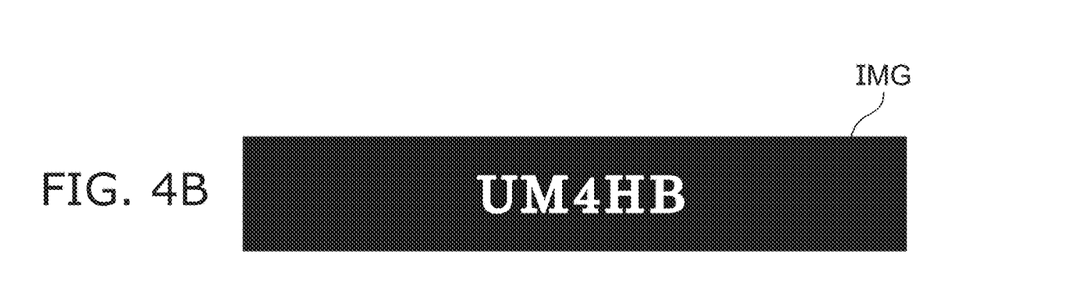
Figure 4C:
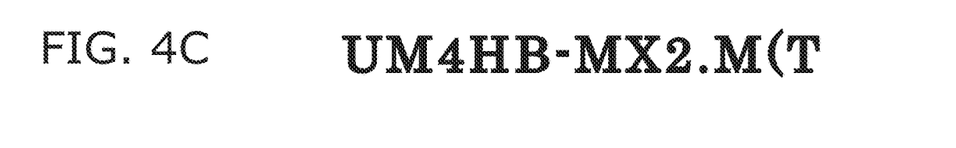

FIG. 3 is a flowchart showing processing according to the search device according to the embodiment. FIGS. 4A to 4C illustrate specific examples of the processing.

In a search method M1 shown in FIG. 3, the search device 10 acquires data of the first character string input by the input device 20 (step S1). The acquired data is, for example, text data. The first character string may be acquired from a database, etc. The first character string may be input from another processing device. The search device 10 may extract text data that includes only character codes from data that includes attributes such as the typeface, line spacing, etc.

The search device 10 uses the first character string that is input to generate a character string image of the first character string (step S3). FIG. 4A is an example of the first character string that is input. FIG. 4B shows a character string image IMG generated from the character string of FIG. 4A.

The search device 10 inputs the generated character string image to the classifier C (step S5). The classifier C is pre-trained to output a classification according to the input of an image. The classifier C outputs a classification result of the first character string when the character string image is input.

The search device 10 acquires the classification result of the first character string from the classifier C (step S7). Based on the classification result, the search device 10 outputs another character string that is different from the first character string (step S9). Here, the classification is the corresponding character string. In other words, according to the input of the image, the classifier C outputs a corresponding character string that corresponds to the character string indicated by the image. If the classification result of the classifier C is appropriate, a corresponding character string in the database that corresponds to the first character string is output. The display device 30 displays the corresponding character string that is output.

For example, the classification result that is output from the classifier C includes multiple classifications (corresponding character strings) and certainties of the classifications. The search device 10 outputs the corresponding character string having the highest certainty. The search device 10 may output the multiple corresponding character strings in order of decreasing certainty. FIG. 4C shows the classification result (the corresponding character string) of the character string image IMG of FIG. 4B.

The specific configuration of the classifier C is arbitrary as long as the image can be classified. For example, the classifier C may include a neural network, a support vector machine, a k-nearest neighbor algorithm, a decision tree, or random forests. Favorably, the classifier C includes a neural network. From the perspective of classification accuracy, it is more favorable for the classifier C to include a convolutional neural network (CNN).

Figure 5:
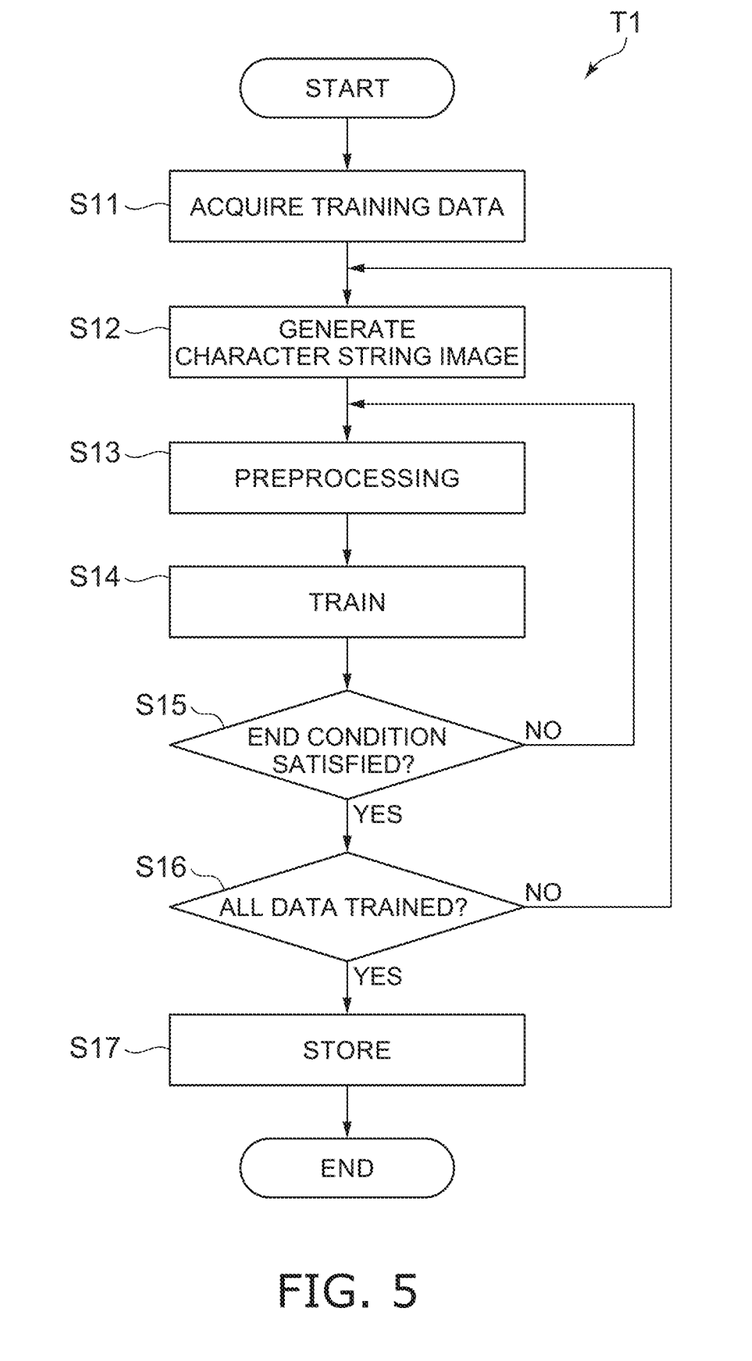
FIG. 5 is a flowchart showing a training method of the classifier.

FIG. 5 is a flowchart showing a training method of the classifier.

The training is performed by the search device 10. The training may be performed by another processing device. The search device 10 acquires training data in the training method T1 shown in FIG. 5 (step S11). The training data is acquired from the database. The training data includes multiple data sets. Each data set includes a character string and a corresponding character string for the character string. The training data may be input by the user using the input device 20. The training method shown in FIG. 5 is applicable to the various classifiers C described above.

The search device 10 generates the character string image for training from the acquired training data (step S12). The search device 10 performs preprocessing of the character string image (step S13). The preprocessing includes at least one selected from adding noise to the character string image, modifying the size of the character string, rotating the character string image, and inverting the character string image. The rotation angle, the inversion direction, etc., can be set as appropriate by the user.

The search device 10 sets the preprocessed character string image as the input data of the classifier C and sets the classification (the corresponding character string) as the teaching data of the classifier C. The search device 10 trains the classifier C to use the input data to output the classification that is set as the teaching data (step S14).

The search device 10 determines whether or not the end condition is satisfied (step S15). For example, the number of training iterations for one character string is set as the end condition. The search device 10 determines whether or not the training has been performed a set number of times for one character string. Or, the accuracy of the classification of the classifier C may be set as the end condition. The search device 10 determines whether or not the error of the classification result output from the classifier C for the classification that is set as the teaching data is less than a preset threshold. The least-squares error can be used as the error.

When the end condition is not satisfied, the search device 10 re-performs the preprocessing. For example, the conditions of the preprocessing are set to different conditions from those of the previous preprocessing. The training for one character string is repeated until the end condition is satisfied. When the end condition is satisfied, the search device 10 determines whether or not all of the data sets acquired in step S11 have been trained (step S16). When all of the data sets are not trained, step S12 is re-performed for the untrained data sets.

When the training is completed for all data sets, the search device 10 stores the trained classifier C in the memory device 40. The search device 10 ends the training.

Advantages of the embodiment will now be described.

There are cases where a character string is assigned to some article to identify the article. The assignment of the character string makes it easy to identify the article. On the other hand, there are also cases where groups assign different character strings to the same article. When communicating information related to the article between the groups, it is necessary to convert the character string used by one group into the character string used by another group. Conventionally, the conversion is performed by referring to a database. For example, the person in charge searches for a character string used by one group in the database and acquires the corresponding character string used by another group.

Fluctuation may occur in the character string that is searched in the search task described above. Fluctuation refers to the difference between upper-case characters and lower-case characters, the difference between two-byte characters and single-byte characters, mistypes, etc. Mistypes are, for example, mistakes between ":" (colon) and ";" (semicolon), mistakes between "O" (the letter "O") and "0" (zero), etc. An appropriate search result is not obtained when the searched character string does not match a character string registered in the database.

Therefore, useless time is necessary to search for the corresponding character string. Therefore, technology that can more easily search for the corresponding character string is desirable.

For this problem, the search device 10 according to the embodiment uses the first character string to generate a character string image of the first character string. Then, the search device 10 inputs the character string image to the classifier and outputs another character string different from the first character string based on the classification result of the classifier. In other words, the search device 10 uses the image to search for the corresponding character string. Even when the input character string includes the fluctuation described above, the image of the character string is similar to the image of the character string without the fluctuation. By using the image, an appropriate search result is easily obtained regardless of the fluctuation in the input character string. According to the embodiment, the other character string that corresponds to some character string can be more easily searched.

For example, the search system 1 according to the embodiment is used in a manufacturing organization. The manufacturing organization includes a manufacturing department that manufactures products, a procurement department that procures components, and an ordering department that orders components. The manufacturing department informs the procurement department of the components necessary for manufacturing. The procurement department collectively informs the ordering department of the necessary components. The ordering department orders the components from component suppliers. In such a case, the character strings used in the manufacturing department and the character strings used in the ordering department may be different for the same component. It is necessary for the procurement department to convert the character strings used in the manufacturing department into the character strings used in the ordering department.

Conventionally, much time is spent on this conversion. According to the embodiment, the character strings that are used in the ordering department can be more easily searched based on the character strings used in the manufacturing department.

Modification

Figure 6:
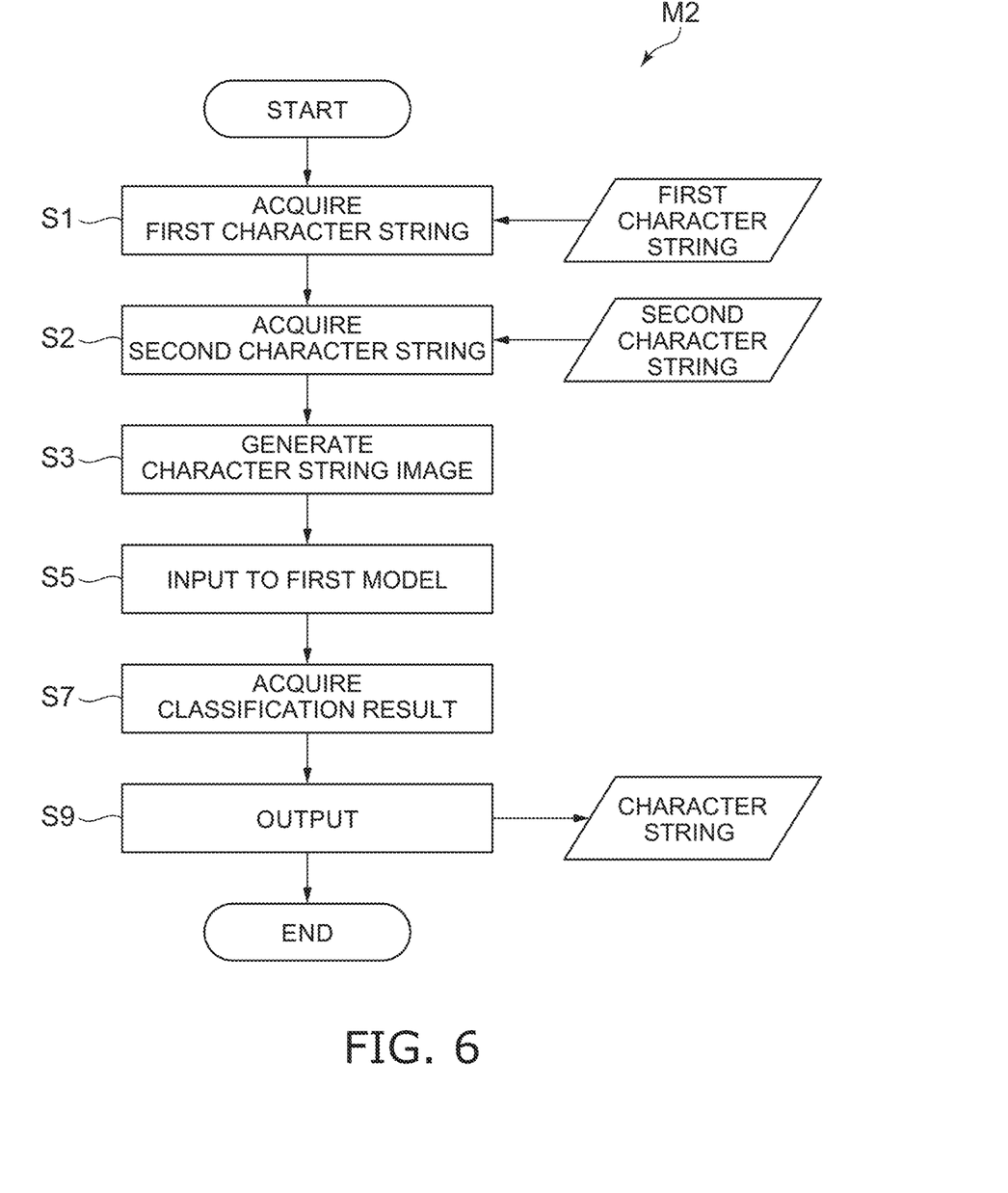
FIG. 6 is a flowchart showing processing of a search device according to a modification of the embodiment.

FIG. 6 is a flowchart showing processing of a search device according to a modification of the embodiment. FIGS. 7A to 7E, FIG. 8A, and FIG. 8B illustrate specific examples of the processing.

Compared to the search method M1, a search method M2 according to the modification shown in FIG. 6 further includes step S2. In step S2, the search device 10 acquires data of a second character string input by the input device 20. The acquired data is, for example, text data. The second character string may be acquired from a database. The second character string may be input from another processing device. The search device 10 may extract text data that includes only character codes from data that includes attributes such as the typeface, line spacing, etc.

Figure 7A:
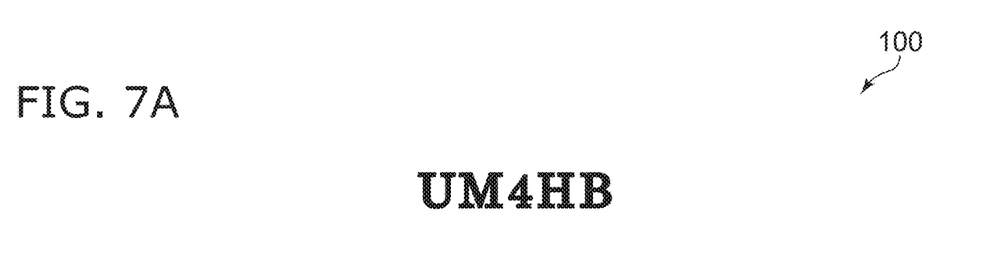
FIGS. 7A to 7E illustrate specific examples of the processing.
Figure 7B:
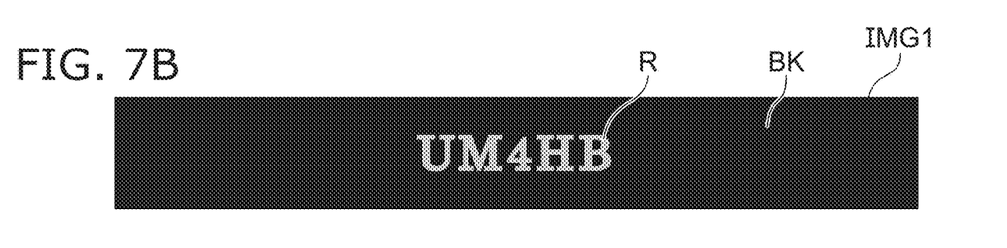
Figure 7C:
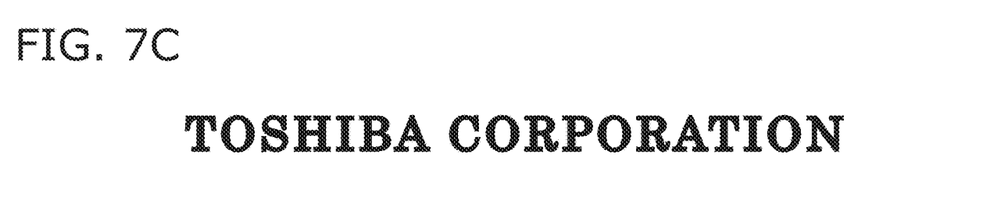

The second character string is different from the first character string and indicates different information from the first character string related to some article. For example, the first character string is a character string for identifying an article, and the second character string indicates an attribute of the article. As an example, the first character string shown in FIG. 7A is assigned to a specific wiring component. As shown in FIG. 7C, the name of the company that supplies the wiring component is used as the second character string.

Figure 7D:
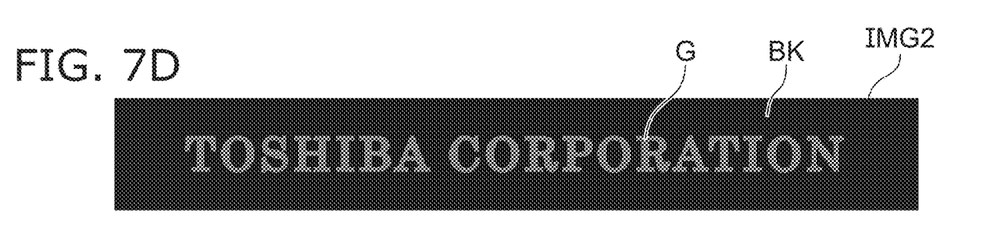
Figure 7E:
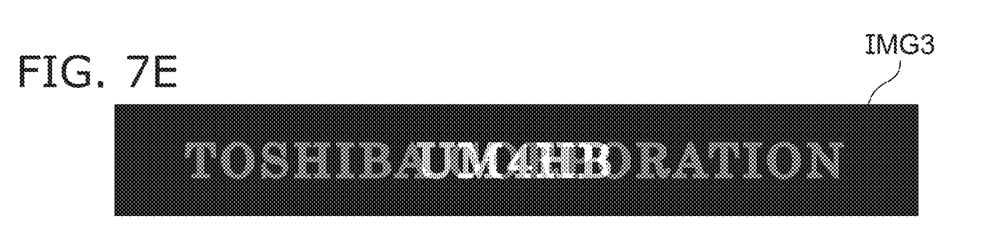

In step S3, the search device 10 generates a character string image of the first and second character strings. For example, the search device 10 generates a first image of the first character string and a second image of the second character string. FIGS. 7B and 7D respectively show a first image IMG1 and a second image IMG2. As shown in FIG. 7E, the search device 10 generates a character string image IMG3 by synthesizing the first image IMG1 and the second image IMG2.

In the example of FIGS. 7B and 7D, the first character string and the second character string are illustrated using mutually-different colors. For example, when the color is represented by 256 gradations, the first character string is represented by red R (i.e., [R, G, B]=[255, 0, 0]). The second character string is represented by green G (i.e., [R, G, B]=[0, 255, 0]). The background is represented by black BK (i.e., [R, G, B]=[0, 0, 0]). The character string image IMG3 shown in FIG. 7E is generated by overlaying the first character string and the second character string.

Figure 8A:
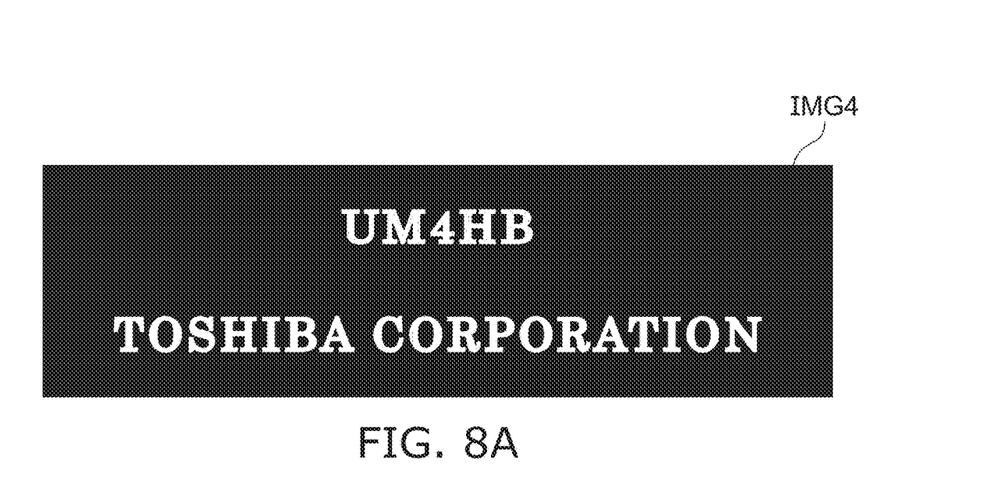
FIGS. 8A and 8B illustrate specific examples of the processing.
Figure 8B:
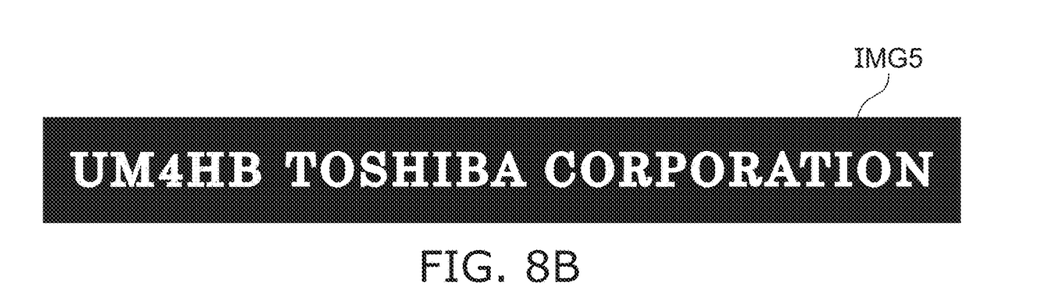

As another example, the search device 10 may generate a character string image IMG4 as shown in FIG. 8A in which the first character string and the second character string are represented using the same color, and the first and second images are vertically arranged. Or, as shown in FIG. 8B, the search device 10 may generate a character string image IMG5 in which the first and second images are laterally arranged.

As described above, the character string image may be generated by synthesizing multiple images respectively of the first and second character strings. Or, the character string image may be directly generated using the first and second character strings.

Thereafter, the generated character string is used to perform steps S5, S7, and S9 similarly to the search method M1. Another character string that corresponds to the first and second character strings is obtained thereby.

Compared to when only the first character string is used, the information that is utilized in the conversion is increased by using the second character string in addition to the first character string. The conversion accuracy can be increased by increasing the information.

Here, an example is described in which two types of character strings are used. The character strings are not limited to the example; three or more types of character strings may be used. In such a case, the search device 10 generates three or more types of images respectively of the three or more types of character strings. The character strings in the images are represented using mutually-different colors. The search device 10 uses the three or more types of images to generate a character string image. The search device 10 outputs the corresponding character string according to the classification result of the character string image.

Figure 9:
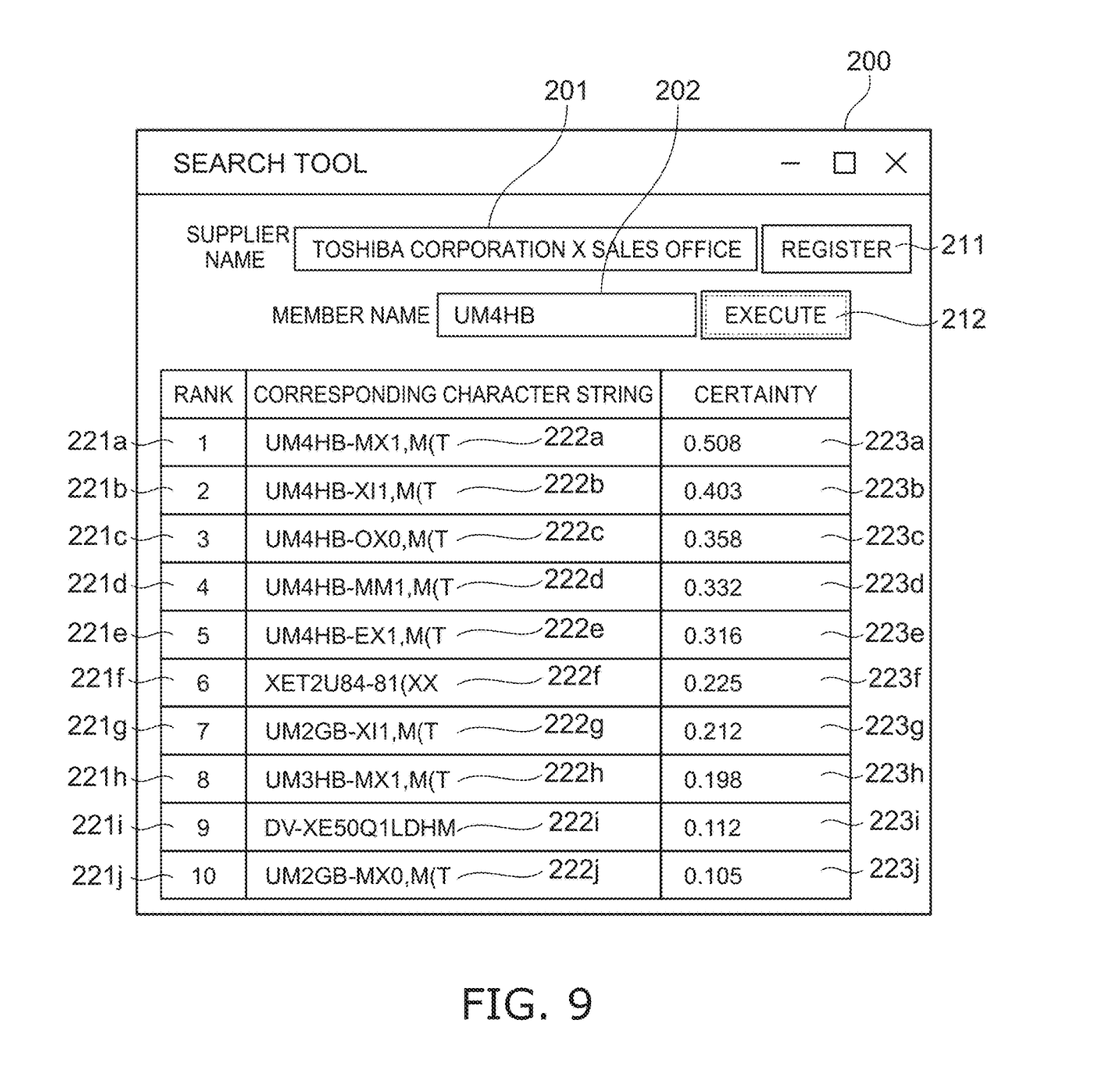
FIG. 9 shows an output example of a search device according to a modification of the embodiment.

FIG. 9 shows an output example of a search device according to a modification of the embodiment.

For example, the search device 10 causes the display device 30 to display a user interface (UI) 200 shown in FIG. 9. The UI 200 includes a first input field 201 for inputting the first character string, and a second input field 202 for inputting the second character string. After inputting the first character string in the first input field 201, the user clicks an icon 211 to register the first character string to be searched. Continuing, the user inputs the second character string in the second input field 202 and then clicks an icon 212 to execute the search.

The search device 10 receives the first and second character strings input by the user, generates the character string image, inputs the character string image to the classifier, and acquires the classification result. The search device 10 displays the classification result 220 in the UI 200. The classification result 220 includes ranks 221a to 221j, classifications 222a to 222j, and certainties 223a to 223j. The certainties 223a to 223j respectively indicate the certainties (the probabilities) of the classifications 222a to 222j. The likelihood of the input character string corresponding to the classification (the corresponding character string) increases as the certainty increases. The ranks 221a to 221j respectively indicate the rank of the certainties of the classifications 222a to 222j. The user selects a corresponding character string corresponding to the input first character string from the classification result 220.

According to the output example shown in FIG. 9, the user can easily find the appropriate character string because multiple corresponding character strings are displayed. The user convenience can be improved.

Figure 10:
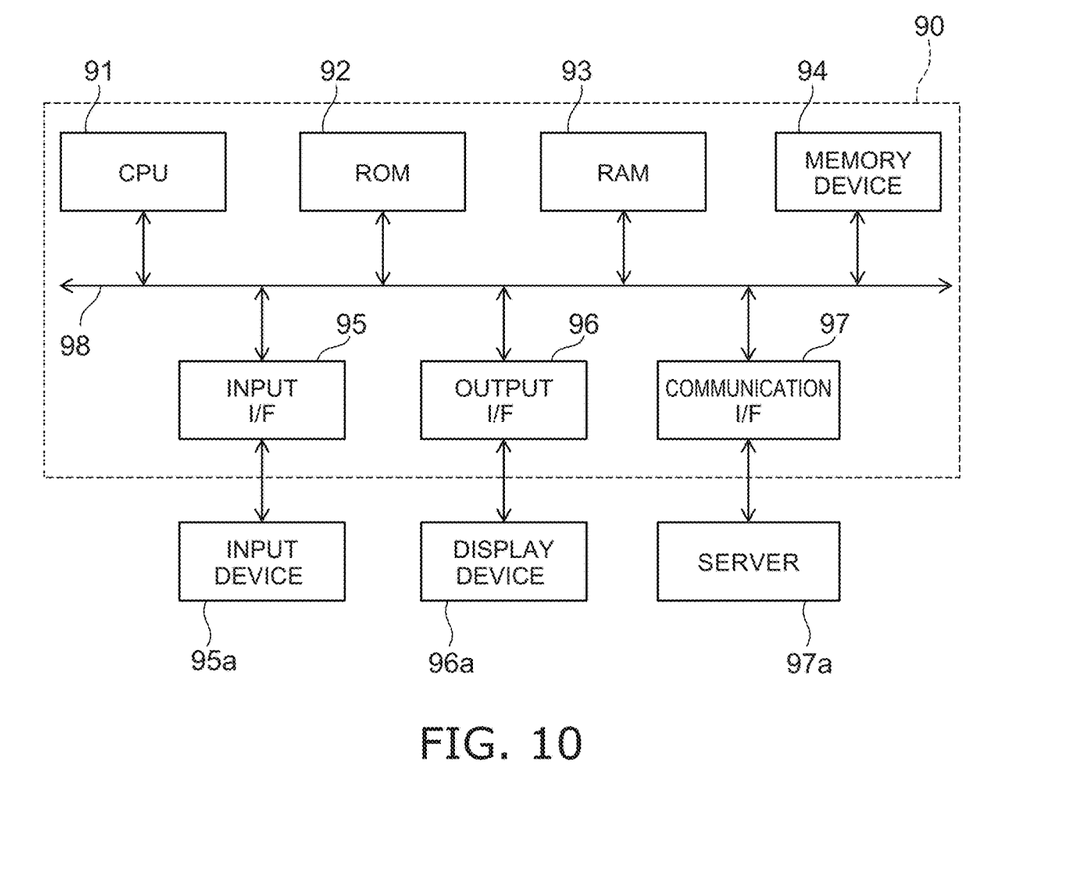
FIG. 10 is a schematic view showing a hardware configuration.

FIG. 10 is a schematic view showing a hardware configuration.

The search device 10 includes, for example, the hardware configuration shown in FIG. 10. A processing device 90 shown in FIG. 10 includes a CPU 91, ROM 92, RAM 93, a memory device 94, an input interface 95, an output interface 96, and a communication interface 97.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the processing device 90 and an input device 95a. The input I/F 95 is, for example, a serial bus interface such as USB, etc. The CPU 91 can read various data from the input device 95a via the input I/F 95.

The output interface (I/F) 96 connects the processing device 90 and a display device 96a. The output I/F 96 is, for example, an image output interface such as Digital Visual Interface (DVI), High-Definition Multimedia Interface (HDMI (registered trademark)), etc. The CPU 91 can transmit data to the display device 96a via the output I/F 96 and cause the display device 96a to display an image.

The communication interface (I/F) 97 connects the processing device 90 and a server 97a outside the processing device 90. The communication I/F 97 is, for example, a network card such as a LAN card, etc. The CPU 91 can read various data from the server 97a via the communication I/F 97.

The memory device 94 includes at least one selected from a hard disk drive (HDD) and a solid state drive (SSD). The input device 95a includes at least one selected from a mouse, a keyboard, a microphone (audio input), and a touchpad. The display device 96a includes at least one selected from a monitor and a projector. A device such as a touch panel that functions as both the input device 95a and the display device 96a may be used. The input device 95a, the display device 96a, and the memory device 94 can be used respectively as the input device 20, the display device 30, and the memory device 40.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes a CPU to execute the instructions described in the program based on the program. In the computer, the acquisition (or the reading) of the program may be performed via a network.

According to the embodiments described above, a search device, a search system, a search method, and a storage medium are provided in which another character string corresponding to some character string can be more easily searched.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A search device, the search device comprising:
a hardware processor configured to execute one or more operations comprising:
accessing a first character string;
generating a character string image of the first character string by applying the first character string to an image generator, wherein content of the character string image matches content of the first character string,
inputting the character string image to a classifier, the classifier trained to output a classification of a character string according to an input of an image, and
outputting a target character string based on a classification result of the classifier, the first character string being one of a plurality of character strings that have a portion in common with the target character string, and the target character string being different from the first character string.

2. The search device according to claim 1, wherein the generating of the character string image includes also using a second character string, and generating the character string image of the first and second character strings.

3. The search device according to claim 2, wherein:
the first character string is a character string for identifying an article, and
the second character string indicates an attribute of the article.

4. The search device according to claim 2, wherein the character string image is generated by overlaying the second character string and the first character string so that the second character string has a different color from the first character string.

5. The search device according to claim 2, wherein the character string image is generated by arranging the second character string with the first character string.

6. The search device according to claim 1, wherein:
the classification result includes a plurality of character strings including the target character string,
the classification result includes a plurality of certainties respectively of the plurality of character strings, and
the classification result is output.

7. The search device according to claim 1, wherein the classifier includes a convolutional neural network.

8. A search system, comprising:
the search device according to claim 1;
an input device receiving an input of the first character string; and
a display device displaying the target character string.

9. A search method, comprising:
causing a processing device to;
access an input character string;
generate a character string image of the input character string by applying the input character string to an image generator, wherein content of the character string image matches content of the input character string,
input the character string image to a classifier, the classifier trained to output a classification of character string data according to an input of an image, and
output an output character string based on a classification result of the classifier, the input character string being one of a plurality of character strings that have a portion in common with the output character string, and the output character string being different from the input character string.

10. A non-transitory computer-readable storage medium storing a program, the program comprising computer-executable instructions that cause a processing device to:
access an input character string;
generate a character string image of the input character string by applying the input character string to an image generator, wherein content of the character string image matches content of the input character string,
input the character string image to a classifier, the classifier trained to output a classification of character string data according to an input of an image, and
output an output character string based on a classification result of the classifier, the input character string being one of a plurality of character strings that have a portion in common with the output character string, and the output character string being different from the input character string.

\* \* \* \* \*